(12) United States Patent
Carmody et al.

(10) Patent No.: US 9,098,094 B2
(45) Date of Patent: Aug. 4, 2015

(54) SEAL SUPPORT SYSTEM PRESSURE TRACKING VALUE

(75) Inventors: Christopher John Carmody, Doncaster (GB); Stephen Martin Shaw, Sheffield (GB); Andrew John Stoney, Ashbourne (GB)

(73) Assignee: AES Engineering Ltd., Rotherham (GB)

( * ) Notice: Subject to any disclaimer, the term of this patent is extended or adjusted under 35 U.S.C. 154(b) by 435 days.

(21) Appl. No.: 13/642,915

(22) PCT Filed: Apr. 26, 2011

(86) PCT No.: PCT/GB2011/000646
§ 371 (c)(1),
(2), (4) Date: Nov. 7, 2012

(87) PCT Pub. No.: WO2011/131952
PCT Pub. Date: Oct. 27, 2011

(65) Prior Publication Data
US 2013/0048108 A1    Feb. 28, 2013

(30) Foreign Application Priority Data

Apr. 23, 2010  (GB) .................................. 1006812.0

(51) Int. Cl.
*G05D 11/00*     (2006.01)
*G05D 16/18*     (2006.01)

(52) U.S. Cl.
CPC ......... *G05D 16/185* (2013.01); *Y10T 137/2645* (2015.04); *Y10T 137/7793* (2015.04)

(58) Field of Classification Search
CPC ...................................................... G05D 16/10
USPC ............... 137/115.13, 115.27, 116.3, 118.06, 137/505.11, 505; 277/431, 432
See application file for complete search history.

(56) References Cited

U.S. PATENT DOCUMENTS 3,171,354 A   3/1965 Söhlemann et al.
3,568,436 A   3/1971 Heffner et al.

FOREIGN PATENT DOCUMENTS

WO    WO 2009/156729 A1    12/2009

*Primary Examiner* — Kevin Murphy
*Assistant Examiner* — R. K. Arundale
(74) *Attorney, Agent, or Firm* — Edwin D. Schindler

(57) ABSTRACT

A pressure regulation tracking valve for maintaining the pressure of a gas relative to that of a process fluid includes a device, responsive to change in the pressure of the process fluid, for changing the pressure of the gas by substantially the same amount. The valve further includes a device for accommodating a pressure transfer medium for transferring the pressure of the process fluid to the gas pressure changing device. As a result, contact between the process fluid and the gas pressure changing device is avoided.

10 Claims, 6 Drawing Sheets

SEAL SUPPORT SYSTEM PRESSURE TRACKING VALUE

FIELD OF THE INVENTION

This invention relates to seal support systems and especially systems, which are used with mechanical seals for the containment of process fluid.

BACKGROUND TO THE INVENTION

A seal support system typically comprises a vessel or tank which generally contains a volume of fluid. The vessel is piped to a sealing device on a pump, mixer or item of rotating equipment. Generally a return pipe leads back to the vessel from the sealing device, hence closing the "loop". This allows the fluid, contained in the vessel, to enter and exit the sealing device. Typically such a seal support system is employed with a mechanical seal with two or more sets of seal faces, more commonly referred to as a double or dual seal.

The fluid within the vessel is generally chosen so that it lubricates and cools the components within the sealing device, whilst being compatible with the process fluid. The industry term for the fluid contained within the vessel is barrier or buffer fluid.

It is not uncommon for the seal support system to have other items of equipment, sited around the vessel, to permit pressure to be applied to the barrier/buffer fluid, or to allow additional cooling or fluid circulation around the seal.

Generally, the sealing device sited on the item of rotating equipment is a mechanical seal comprising a rotating member, which is secured to a shaft, and a stationary member which is secured to a housing.

The interface, between the rotating member and the stationary member, on the mechanical seal, prevents the processed product from escaping.

The majority of mechanical seals have a fluid film acting between the two sliding seal faces. This fluid film lubricates the seal faces. The wider the fluid film, the more the mechanical seal is liable to leak. Therefore, over time some fluid loss from the vessel is to be expected.

Furthermore, mechanical seals are often subjected to process upsets. Pressure surges and sudden rises in fluid temperature can result in barrier/buffer fluid loss.

Yet further loss of fluid from the vessel may result from evaporation.

Conventional dual seals should have the barrier fluid set at a higher pressure than the process pressure as this ensures clean barrier fluid lubricates the sliding seal faces instead of contaminated process fluid.

Unfortunately, some items of rotating equipment, for instance, equipment used in batch processes, can be subject to fluctuating process pressures in the seal chamber. It is not uncommon for the process pressure, in a typical application, to change from, say, 2 bar (30 psi) to 12 bar (175 psi). Given that this pressure fluctuation is a primary reason why the mechanical seal will fail, operators set the barrier fluid higher than the maximum process fluid pressure. From the above example, the seal would be set at 14 bar (205 psi). This means that when the process pressure is at 2 bar (30 psi) the seal barrier fluid is at 14 bar (205 psi) creating a massive closing force on the two sets of seal faces. This closing force increases the heat generated by the seal which in turn breaks down the fluid film between the seal faces resulting in premature seal failure.

In order to provide a solution to this problem, the pressure in the equipment seal chamber is tracked to create a reference pressure. This reference pressure is then connected to a pressure source, typically nitrogen which is connected to the seal support vessel. The nitrogen then pressurises the barrier fluid to ensure it is greater then the reference pressure. This system ensures that the barrier fluid maintains a constant pressure above the process pressure, irrespective of the process pressure fluctuations.

The problem arises when the process application requires a barrier fluid media which is not compatible with the pressure gas/nitrogen. An example of this is an oil barrier fluid where the nitrogen acts to aerate the oil, effectively injecting small gas bubbles into the oil. If these gas bubbles work their way to the mechanical seal faces, they will cause the seal faces to dry run, resulting in premature seal failure.

Another issue is that the seal support systems can operate in a variety of ambient temperature climates which fluctuate due to geography and time of day in addition to the process fluid temperature fluctuations. If the barrier temperature changes between night and day, as found, for instance, in applications in Saudi Arabia in the Middle East, this changes the barrier fluid pressure which results in changes in the system pressure differential constant between the barrier and process fluid.

A further issue in conventional systems is that the process fluid reference pressure, taken from the seal chamber, is directly connected to the accumulator. This can lead to chemical compatibility issues between the process fluid and the accumulator parts as well as seizing the accumulator when used with viscous process media.

STATEMENTS OF THE INVENTION

According to the present invention there is provided a pressure regulation tracking valve for maintaining the pressure of a gas relative to that of a process fluid, the valve comprising means, responsive to a change in the pressure of the process fluid, for changing the pressure of the gas by substantially the same amount, and means for accommodating a pressure transfer medium for transferring the pressure of the process fluid to the gas pressure changing means, whereby contact between the said process fluid and the said gas pressure changing means is avoided.

Preferably the valve comprises means for connecting the valve to a source of process fluid, means for supplying the gas to a location within said valve, means for exiting gas from the location, means, responsive to an increase in process fluid pressure, to open said location to said gas supply means, and means, responsive to a decrease in process fluid pressure, to open said location to said gas exiting means.

Preferably the valve comprises first and second diaphragms, means for connecting the pressure of said process fluid to respective first sides of said diaphragms, said location being in fluid communication with respective second sides of said diaphragms, the first diaphragm being arranged so that a reduction of process fluid pressure causes said first diaphragm to open said location to said gas exiting means and said second diaphragm being arranged so that an increase of fluid pressure causes said second diaphragm to open said location to said gas supply means, a further location for containing the pressure transfer medium and extending between first side of said first diaphragm and said first side of said second diaphragm, and a third diaphragm having a first side in fluid communication with said further location and a second side in fluid communication with the process fluid source connecting means.

Preferably the means for supplying the gas include means for connection to a seal support system for supplying barrier fluid to a mechanical seal.

Preferably each of said first and second diaphragms is provided with means for increasing pressure applied to a first side above that of the process fluid.

Preferably the pressure increasing means has a fixed bias setting.

Preferably the pressure increasing means are springs.

Preferably the second diaphragm is connected to a spring urged piston mounted for movement between positions in which said location is respectively open and closed to said gas.

Preferably said piston is mounted for movement in a direction towards and away from said diaphragm.

Preferably the valve includes a first housing accommodating said first and second diaphragms and a second housing attached to said first housing and accommodating said third diaphragm.

Preferably the three diaphragms are arranged in line within the valve with the second diaphragm being located between the first and third diaphragms.

Preferably the gas exiting means comprises means for venting gas to atmosphere.

Preferably the source of said process fluid is a seal chamber of the mechanical seal.

Preferably, the valve of the invention is a one piece unit, for ease of installation.

Preferably, the valve of the invention is a modular unit in that it can be supplied with or without the means for connecting the valve to a source of process fluid.

The invention will now herewith be described with the aid of the following drawings.

DETAILED DESCRIPTION OF THE INVENTION

The invention will now be described, by way of examples only, with reference to the accompanying drawings.

Figure 1:
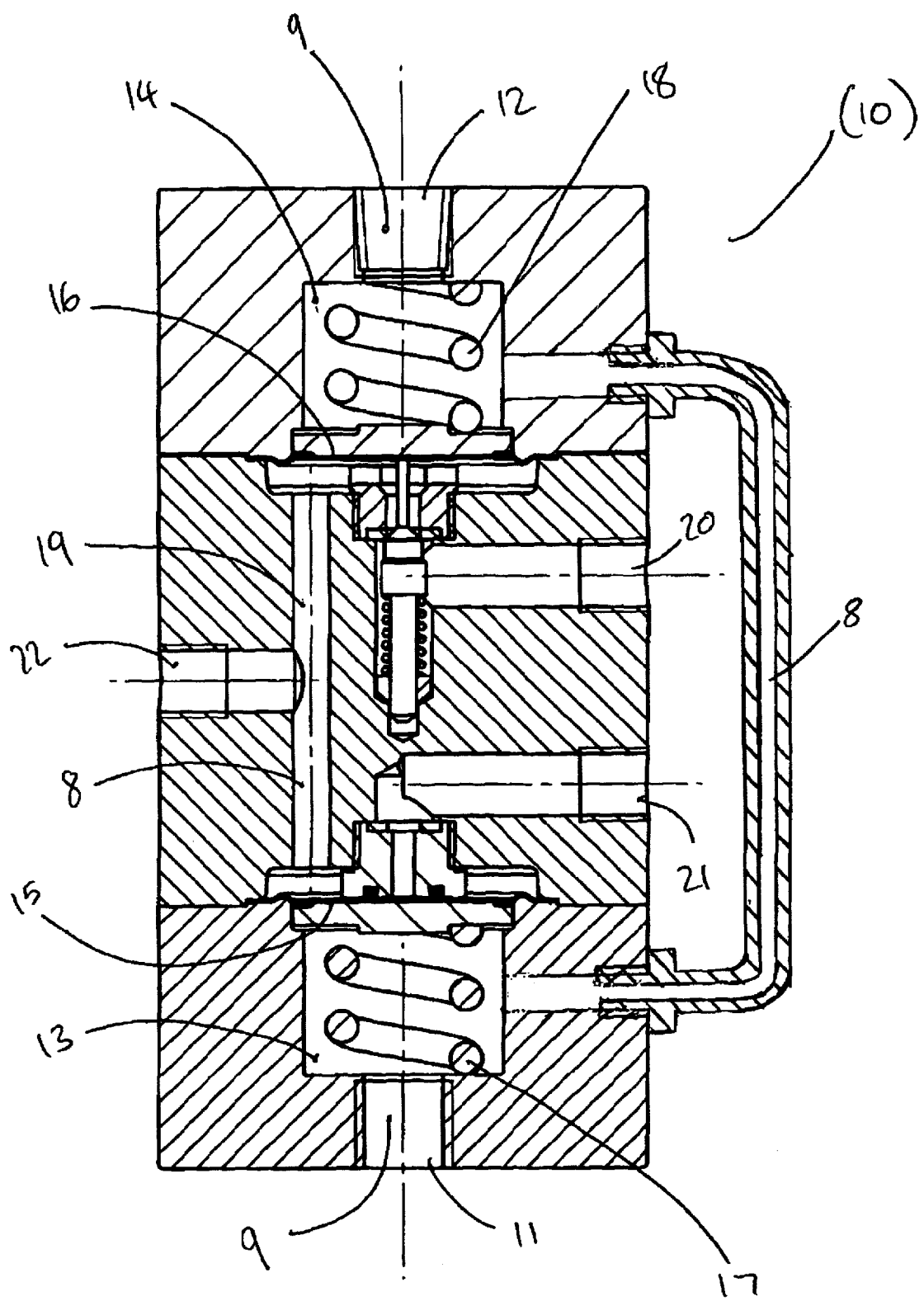
FIG. 1 is a cross sectional view of a prior art pressure tracking valve

FIG. 1 is a cross sectional view of a prior art pressure tracking valve 10 for use with an item of industrial equipment such as a pump (not shown) which is sealed with a sealing device such as a mechanical seal (not shown)

The pump is processing a fluid (process fluid 9) typically operating at a fluctuating pressure and being in communication from the seal chamber of the item of industrial equipment to the pressure tracking valve 10. The process fluid 9 enters the valve 10 through orifices 11 and 12 and into first and second chambers or cavities 13 and 14. The process fluid 9 is sealed from leaving first 13 and second 14 chambers by metal diaphragm plate members 15 and 16. Process fluid 9 communicates between chambers 13 and 14 by a suitable communication bore 8.

Two or more spring members 17 and 18, positioned in each chamber 13 and 14, act in the same longitudinal direction as the process media, towards the diaphragm plates 15 and 16. The forces acting on each diaphragm are a result of the spring load and the process fluid pressure acting over the diaphragm exposed surface. This will be explained further with reference to FIGS. 2 and 3.

A location 19, or third chamber, within the valve 10, which also provides communication bore 8, is filled with an inert gas 8 such as nitrogen. The inert gas is supplied from a pressure source (not shown) to orifice 20. Orifice 21 is use to vent surplus inert gas and orifice 22 is in communication with the seal support system (not shown) attached to the sealing device (not shown).

Figure 2:
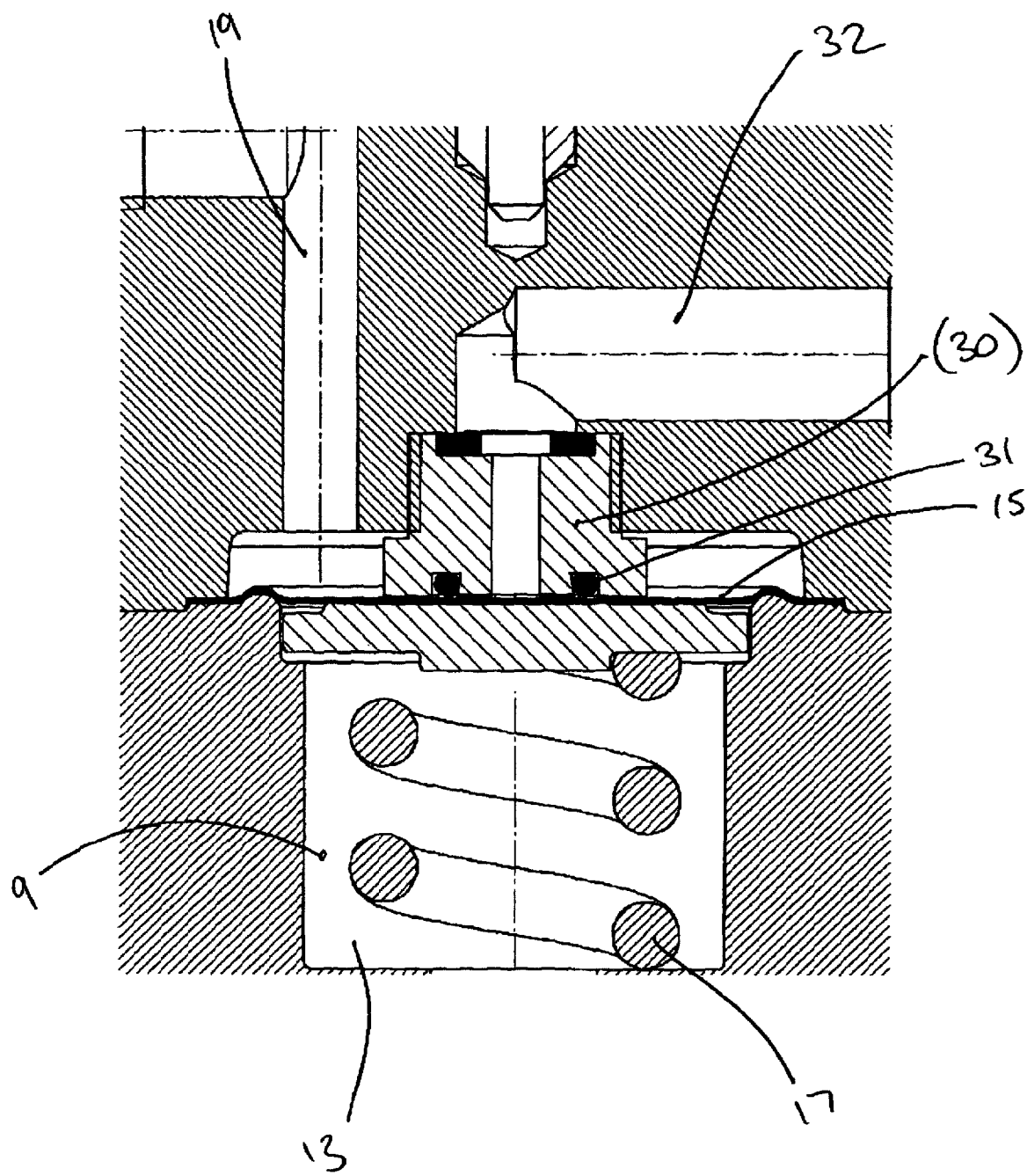
FIG. 2 corresponds to FIG. 1 and is an enlarged partial cross sectional view of the inert gas vent means of chamber four FIG. 3 corresponds to FIG. 1 and is an enlarged partial cross sectional view of the inert gas pressurisation means of chamber four

FIG. 2 corresponds to FIG. 1 and is an enlarged partial cross sectional view of the inert gas vent means 30.

Process fluid 9 is in the first chamber 13 and seal/system inert gas is in the third chamber 19. The inert gas is pressurised to equal the resulting force from the pressure of the process fluid 9 acting on the diaphragm 15 plus the force of the spring 17. When the process fluid pressure 9 reduces, the force on the diaphragm reduces, hence the diaphragm moves longitudinally away from the sealing association with O ring 31. This allows nitrogen gas to be vented into cavity 32 and out to atmosphere, until such a time as the forces on the diaphragm 15 equalise.

Figure 3:
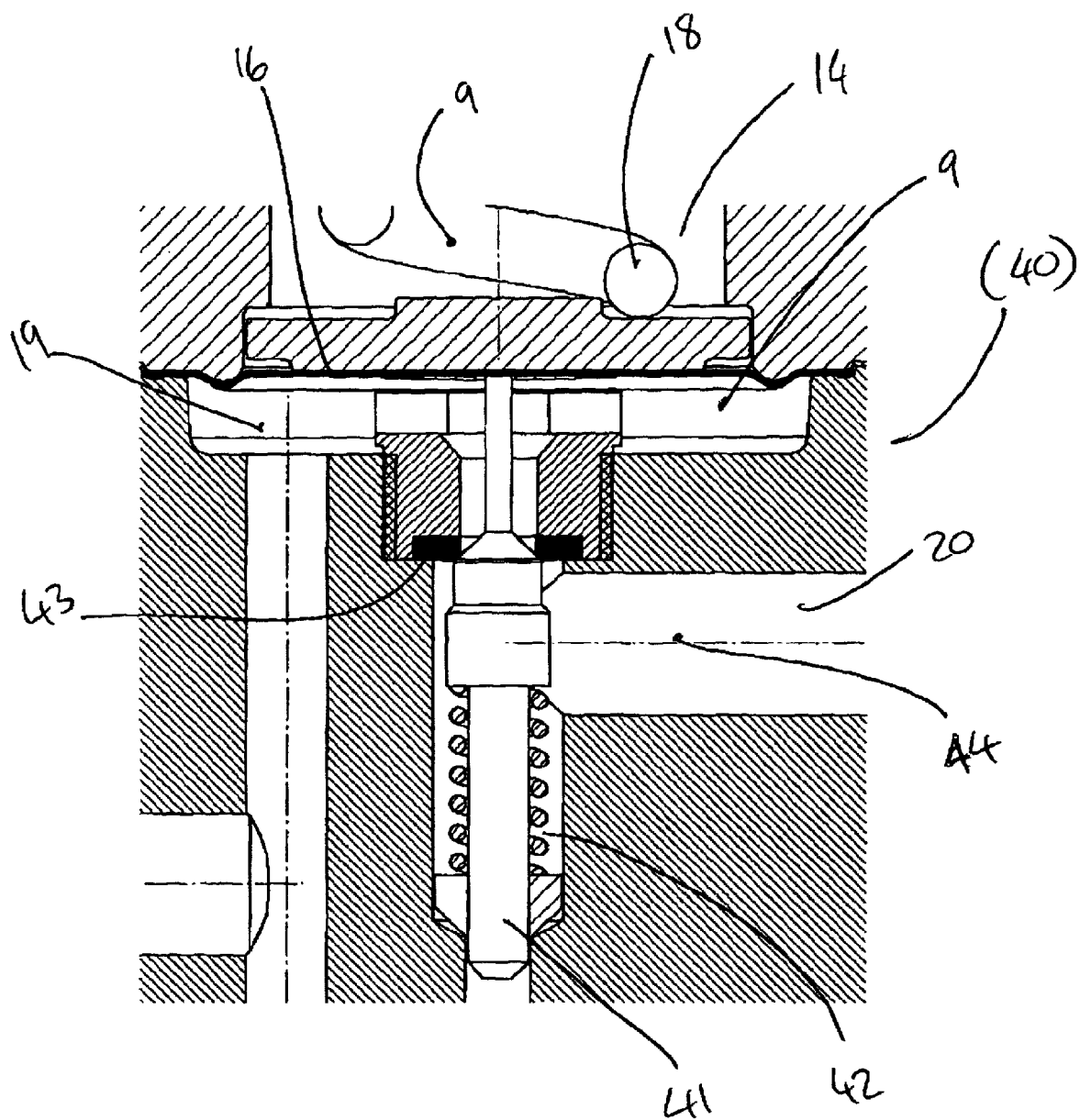

FIG. 3 corresponds to FIG. 1 and is an enlarged partial cross section of the pressurisation means 40. An inert gas pressure source 44 is connected to the valve 10 at orifice 20. Piston 41 is urged against the seal seat 43 by spring 42. The process fluid 9 is in the second chamber 14.

The inert gas 9 in the third cavity is pressurised to equal the resulting force from the pressure of the process fluid 9 acting on the diaphragm 16 plus the force of the spring 18. When the process fluid pressure 9 increases, the force on the diaphragm increases, hence the diaphragm moves longitudinally towards the piston 41. This compresses the spring 42 and disengages the sealing relationship between the piston 41 and the sealing seat 43. This allows nitrogen gas 44, at higher pressure than barrier fluid 9 to enter into cavity 19, until such a time as the forces on the diaphragm 16 equalise.

The above described device can only used with clean process fluids as contaminated process fluid will stick and clog first 13 and second 14 chambers, making springs 17, 18 and 42 malfunction.

Figure 4:
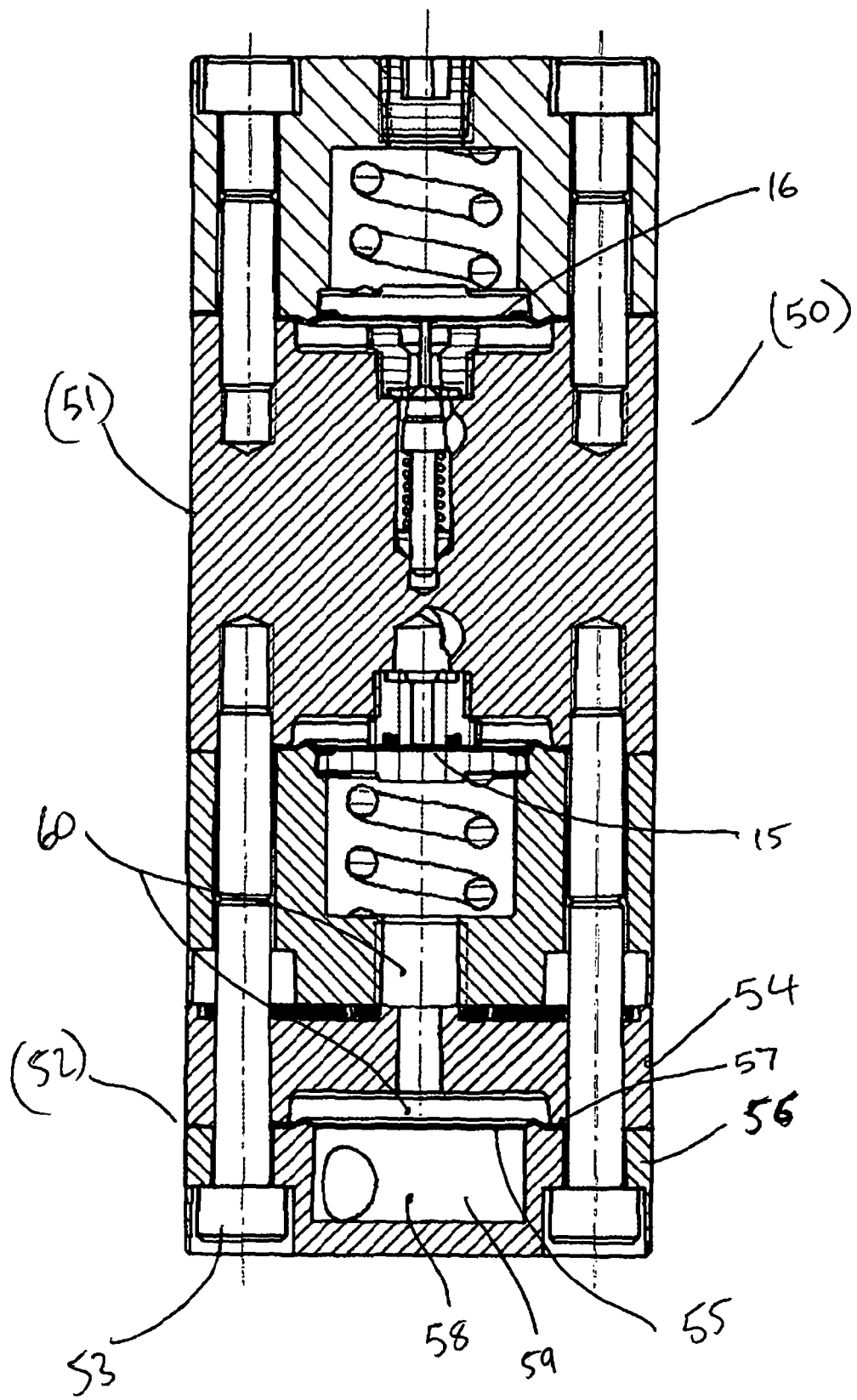
FIG. 4 is a cross sectional view of the valve of the invention FIG. 5 corresponds to FIG. 4 and is an alternative cross sectional view of the design of the invention FIG. 6 corresponds to FIG. 4 and is an alternative cross sectional view of the design of the invention

FIG. 4 is a cross sectional view of a valve 50 of the invention. In effect, this valve comprises a component 51, which is similar to the valve 10 of FIG. 1, and components 51 and 52 being connected together by screws 53.

Component 52 consists of clamp piece 54, a metal diaphragm 55 and clamp cap 56. The diaphragm makes sealing engagement between members 54 and 56 around its radial surface 57.

Process fluid 58 enters chamber 59 and acts to apply a displacement force on diaphragm 55.

Further location (chamber or cavity) 60 is filled with an incompressible fluid such as silicone oil which acts as a transfer medium to transfer the diaphragm displacement force from diaphragm 55 to diaphragms 15 and 16.

When the process fluid pressure fluctuates, the transfer oil displaces in cavity 60 and hence causes diaphragms 15 and 16 to fluctuate. This fluctuation, as previously described, alters the inert gas nitrogen pressure which influences the seal behaviour.

Figure 5:
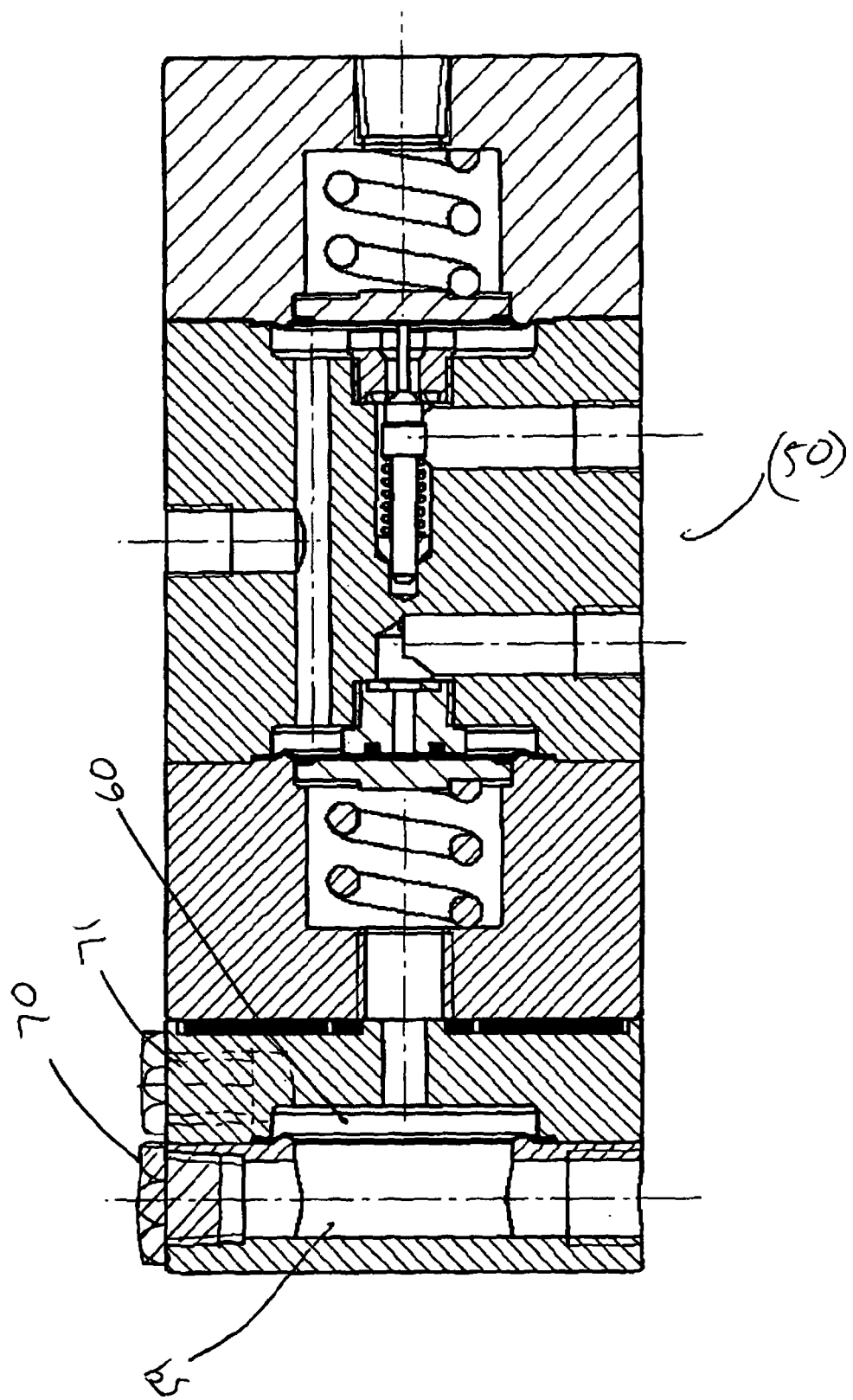

FIG. 5 corresponds to FIG. 4 and is an alternative cross sectional view of the valve. From FIG. 5, one can see that the process fluid in chamber 59, can be correctly vented by displacing plug seal 70. Equally, transfer fluid in chamber 60 can be correctly vented by displacing plug seal 71.

Figure 6:
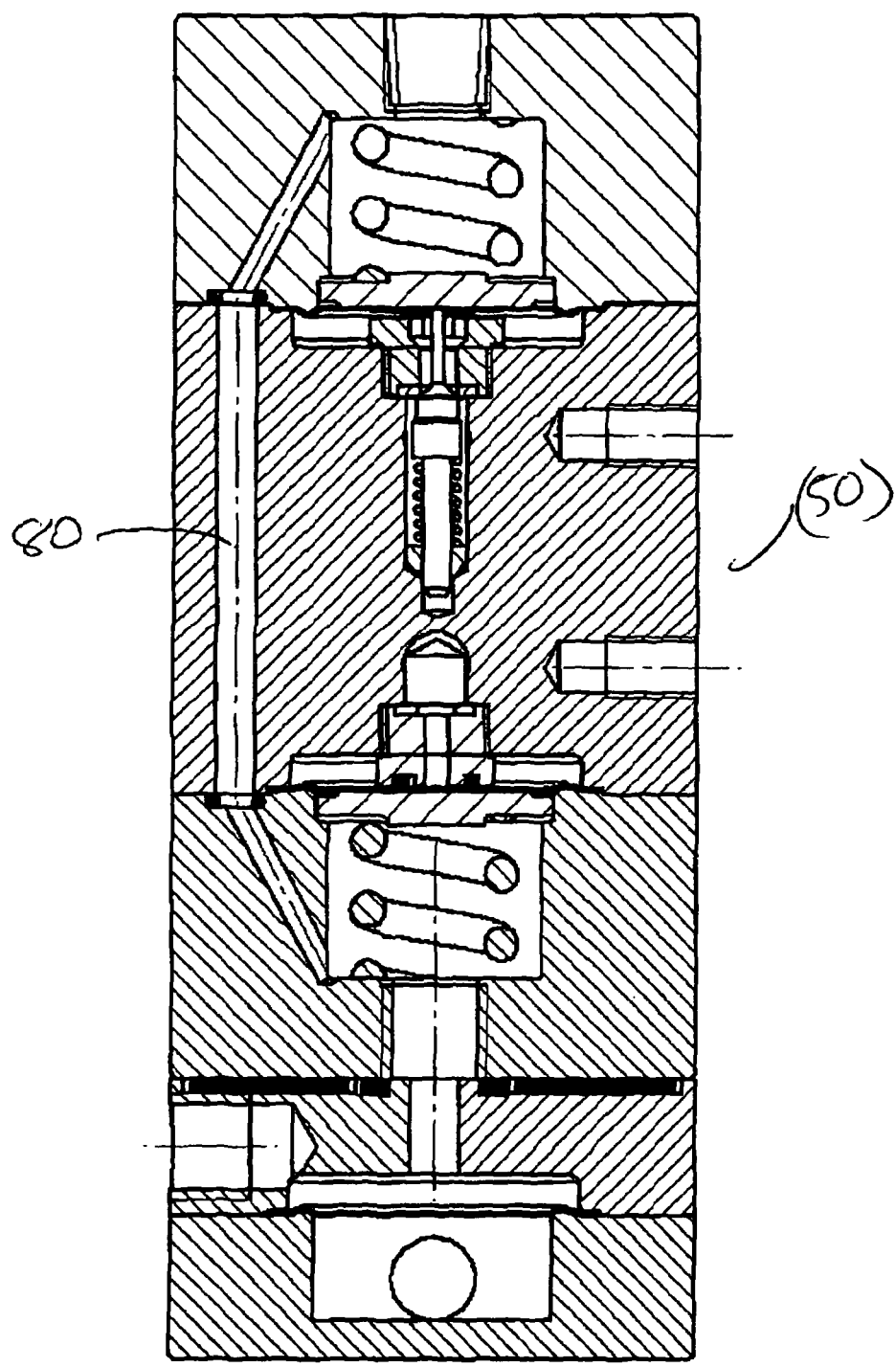

FIG. 6 corresponds to FIG. 4 and is an alternative cross sectional view of the valve. The transfer fluid communication orifice 80 is positioned inside the outer circumference of the valve 50 as shown, this being appropriate since the transfer fluid is relatively non-clogging. Therefore, the size of the communication orifice is no longer a restricting factor to its successful operation.

The invention claimed is:

1. A pressure regulation tracking valve for maintaining the pressure of a gas relative to that of a process fluid, the pressure regulation tracking valve comprising a first diaphragm, responsive to a change in the pressure of the process fluid, for facilitating changing the pressure of the gas by substantially a same amount, means for accommodating a pressure transfer medium for transferring the pressure of the process fluid to said first diaphragm, means for connecting the pressure regulation tracking valve to a source of process fluid, means for supplying the gas to a location within said pressure regulation tracking valve, means for exiting gas from the location, a second diaphragm, responsive to an increase in process fluid pressure, to open said location to said means for supplying the gas, means, responsive to a decrease in process fluid pressure, to open said location to said means for exiting gas, means for connecting the pressure of said process fluid to respective first sides of said first diaphragm and said second diaphragm, said location being in fluid communication with respective second sides of said first diaphragm and said second diaphragm, the first diaphragm being arranged so that a reduction of process fluid pressure causes said first diaphragm to open said means for exiting gas and said second diaphragm being arranged so that an increase of fluid pressure causes said second diaphragm to open said location to said means for supplying the gas, a further location for containing the pressure transfer medium and extending between first side of said first diaphragm and said first side of said second diaphragm, and a third diaphragm having a first side in fluid communication with said further location and a second side in fluid communication with said means for connecting the pressure regulation tracking valve to a source of process fluid.

2. A pressure regulation tracking valve according to claim 1, wherein the means for supplying the gas includes means for connecting to a seal support system for supplying barrier fluid to a mechanical seal.

3. A pressure regulation tracking valve according to claim 1, wherein each of said first diaphragm and said second diaphragms is provided with means for increasing pressure applied to a first side above that of the process fluid.

4. A pressure regulation tracking valve according to claim 3, wherein said means for increasing pressure has a fixed bias setting.

5. A pressure regulation tracking valve according to claim 4, wherein said means for increasing pressure is a plurality of springs.

6. A pressure regulation tracking valve according to claim 1, wherein the second diaphragm is connected to a spring urged piston mounted for movement between positions in which said location is respectively open and closed to said gas.

7. A pressure regulation tracking valve according to claim 6, wherein said piston is mounted for movement in a direction towards and away from said second diaphragm.

8. A pressure regulation tracking valve according to claim 1, further comprising a first housing accommodating said first diaphragm and said second diaphragm and a second housing attached to said first housing and accommodating said third diaphragm.

9. A pressure regulation tracking valve according to claim 1, wherein said first diaphragm, said second diaphragm and said third diaphragm are arranged in line within the pressure regulation tracking valve.

10. A pressure regulation tracking valve according to claim 1, wherein the means for exiting gas comprises means for venting gas to the atmosphere.

* * * * *